July 25, 1939.   J. G. DICKSON   2,167,475
METHOD OF MAKING GASKETS
Filed Oct. 12, 1936   2 Sheets-Sheet 1

Inventor
James G. Dickson
by Parker & Carter
Attorneys.

July 25, 1939.　　　　J. G. DICKSON　　　　2,167,475
METHOD OF MAKING GASKETS
Filed Oct. 12, 1936　　　2 Sheets-Sheet 2

Inventor
James G. Dickson
by Parker + Carter
Attorneys

Patented July 25, 1939

2,167,475

UNITED STATES PATENT OFFICE 2,167,475

METHOD OF MAKING GASKETS

James G. Dickson, Glencoe, Ill., assignor to Dickson Gasket Company, Chicago, Ill., a corporation of Illinois Application October 12, 1936, Serial No. 105,207

1 Claim. (Cl. 29—148)

My invention relates to improvements in gaskets such as are especially adaptable for use in connection with internal combustion engines and the like.

Among the objects of my invention are to provide a gasket which may be used for sealing gas tight joints in engines, pumps and the like without distortion of the engine parts, which will remain gas tight under wide variations of operating temperature and which may be repeatedly reused.

My invention is especially applicable to internal combustion engines of the automotive type though it also has been used in connection with all types of engines and for other purposes where it is necessary to make a gas tight joint.

Gaskets have been used in connection with internal combustion engines comprising a pair of copper plates with a filler of asbestos or similar relatively soft flexible and collapsible material. When the engine cylinder head is drawn down on such a gasket, the copper is compressed, the asbestos is crushed and there is a tendency, resulting from pressure, heat and vibration to cause the asbestos to reduce to a dust or dust-like material, the copper is thus no longer adequately supported and the gas pressure tends to blow out the unsupported copper gasket.

The two copper gasket surfaces in the copper asbestos gasket are held together by grommets or by a portion of the metal of one plate being bent upwardly about one or more of the holes through the gasket and flanged to overlie the other plate. When the bolts that hold the engine head in place are tightened down, there is more resistance at the point where these grommets or flanges are found and experience teaches that as a result of this, the metal of the engine itself is distorted, being compressed around the bolts and at the flanges and uncompressed adjacent the intermediate unsupported portion of the gasket and so this is a fruitful cause for the cylinder wearing into egg shape and for valves or valve apertures getting out of round and the like.

An effort has been made to solve the gasket problem by the use of a solid gasket comprising a relatively thick piece of copper or even sometimes aluminum but such a solid piece does not conform to the irregularities of the machined or case surfaces of the cylinder block or cylinder head, does not expand and contract in conformity with changes in temperature and such gaskets leak and are unsatisfactory. Even when the holding bolts are set up with maximum tightness in an effort to overcome leakage, it still takes place and cylinder head distortion results from the great bolt tensions used.

I have found that when a gasket of the type disclosed in my two Patents Nos. 1,782,870 and 2,034,610 is used, which gaskets comprise a series of metallic laminations or shims held together by grommets or by flanged over portions of one of the gasket plates without any asbestos or similar filler, a gas tight joint is easily obtained which does not blow out, it being possible to use the gasket over and over again.

However, the form of gasket disclosed in the two above mentioned patents does not always solve the problem involved in connection with engine distortion. Under ordinary circumstances these gaskets are loosely assembled, the grommets or flanges which hold them together being left to project considerably above the body of the gasket. When such a gasket as this is placed in an engine and the bolts are tightened up to compress the gasket, a great deal of force may be required to compact and press the gasket down to the size and shape and thickness it has to have in the engine as it operates. Experience teaches that because at first the pressure and tension is localized around the holding bolts and around the grommets themselves, and there is no pressure in the area where the gasket merely comprises the superposed thin laminations, there is a strong tendency for the metal of the engine to flow and cause distortion.

While this difficulty is to some extent minimized by the fact that some of the laminae are cut back or at any rate the total thickness of the laminae below the flange is reduced and therefore the difficulty not so serious with the device of Patent No. 2,034,610 as it is with the device of Patent No. 1,782,870 above referred to wherein there is no reduction of thickness at all, nevertheless the difficulty is sometimes present in connection with both of the aforesaid patents.

I avoid this difficulty by shaping or forming or compressing the gasket into the shape and thickness it is intended to have when in place in the engine. That is to say, I compress the grommets or other holding means, bringing them down substantially to a level with the outer plates of the gasket between rolls or subjecting it to the pressure of the press or punch.

When such a gasket is applied to the engine, it is no longer necessary to apply sufficient force to distort or upset the gasket or change its shape, all that is necessary is to tighten up the bolts snugly so as to make a snug contact between the engine and the surface.

My invention is illustrated more or less diagrammatically in the accompanying drawings, wherein.

Figure 1:
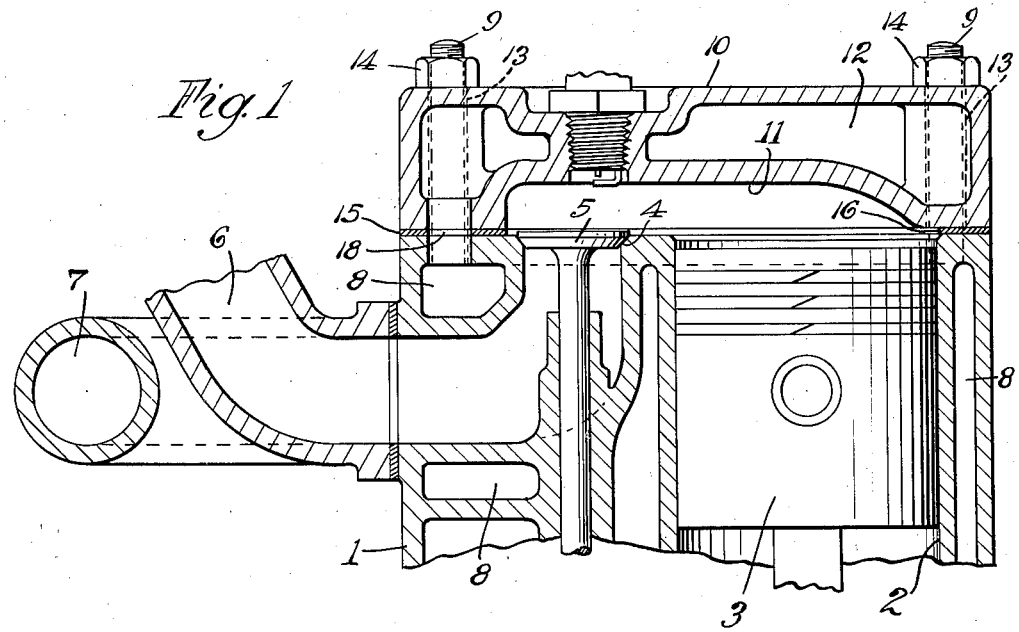
Figure 1 is a diagrammatic section through an engine showing my gasket in place.
Figure 2:
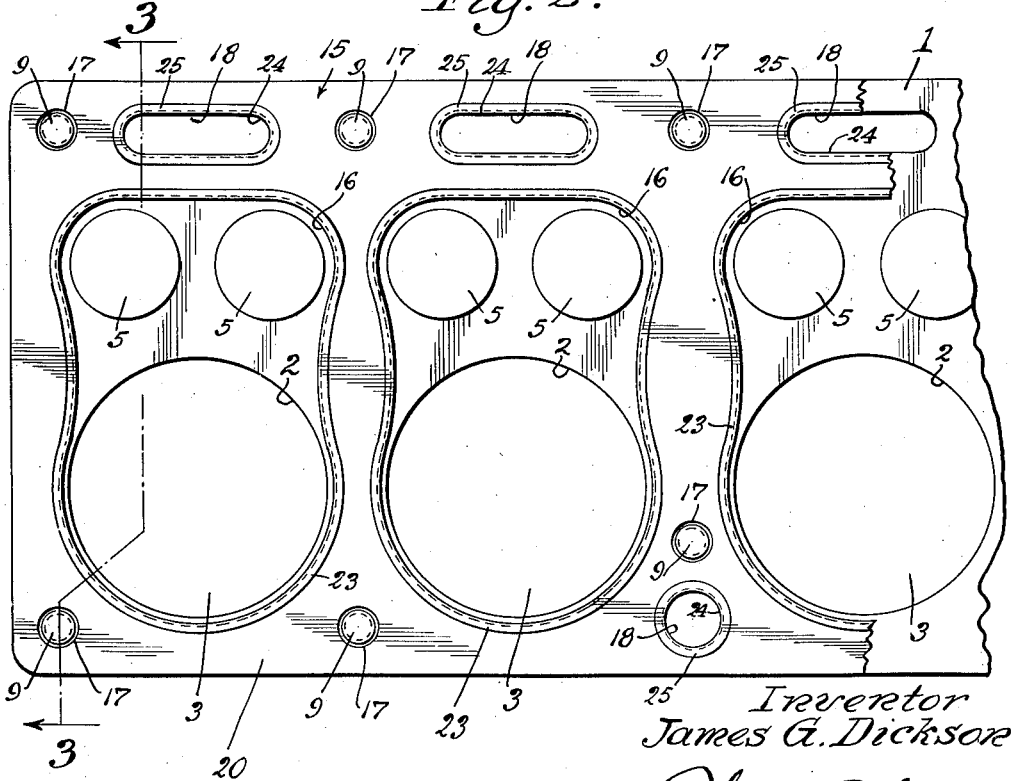
Figure 2 is a plan view of the gasket with parts of the engine.
Figure 3:
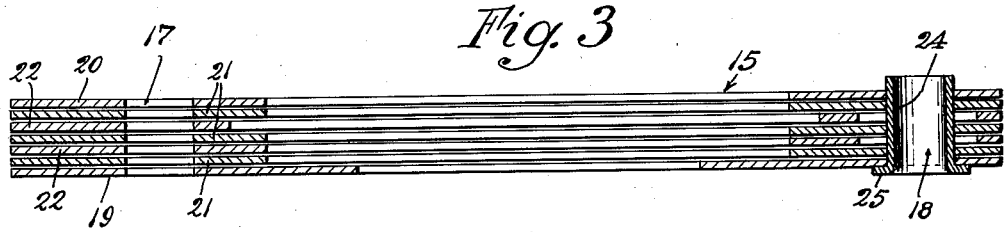
Figure 3 is an enlarged section taken substantially along the line 3—3 of Figure 2 showing the first step in the assembly of the gasket.
Figure 4:
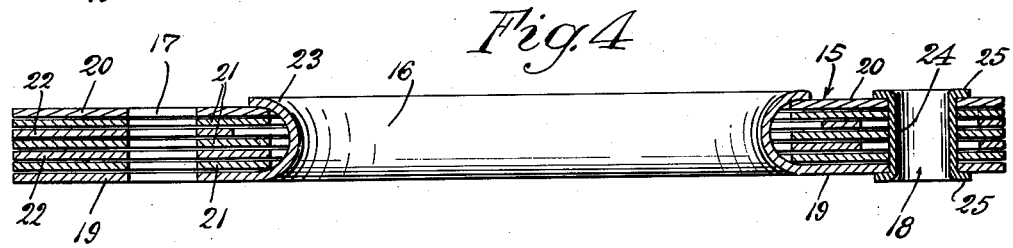
Figure 4 is a section through the gasket before it has been shaped and compacted.

I have illustrated my gasket both as applied to an engine and as shown in process of manufacture.

The engine comprises a block 1, containing a plurality of cylinders 2, pistons 3, valve apertures 4, valves 5, exhaust and intake passages 6 and 7. A water jacket 8, encircles the cylinders and valve apertures and parts of the intake and exhaust passages. These various apertures and passages are open through the upper surfaces of the cylinder block as indicated. 9 are studs or bolts projecting upwardly from the plane face of the cylinder block. The cylinder head is indicated at 10. It is cut away at 11 to provide a clearance space for the cylinder and valve apertures. It contains water jacket spaces 12 which are in register with the water jacket space in the block and is apertured at 13 to engage the bolts 9, which pass up through the head and are associated with nuts 14 adapted to hold the head against the block. 15 is an all metal laminated gasket. It is apertured at 16 to conform to the cylinder and valve pockets of the engine. It is apertured at 17 to permit passage of the holding bolts. It is apertured at 18 about the mating or registering water passages in the block and in the head. When the head is pulled down firmly on the block with the gasket between the head and the block, the gasket then makes the cylinder and gas pocket tight, prevents leakage about the bolts and prevents leakage about the mating water apertures.

The gasket is formed preferably of a bottom plate 19, a cover plate 20 and a series of intermediate filler plates 21 and 22. These plates are all metal plates. There is no foraminous or fibrous or friable asbestos or the like as has been used in the past. All of these plates are apertured or perforated in register to conform to the apertures in the cylinder head and block which the gasket is to be used to seal. Two ways of holding the gasket body together are illustrated though many others might be used. The metal of the bottom plate 19 is bent up through the cylinder and valve pocket apertures intersecting the planes of all the other plates in the gasket and is flanged out as indicated at 23 over the top plate. A grommet 24 is inserted through some of the water jacket holes and it is flanged out at 25 over the top and bottom plate.

Some of the filler plates are reduced in thickness or cut away in register with the flanged portions of the grommet and with the upwardly bent bottom plate. When the grommet is used, more filler plates have to be cut away than when the grommet is not used but in each case we have a situation where the total thickness of the top and bottom cover plates of the gasket and the filler plates is the same as the total thickness of the gasket where the grommet or the flange is used, this being accomplished by cutting away or thinning down the filler plates at the areas in question so that when the gasket is in the shape and of the dimensions intended for use in the engine, it is substantially a parallel faced smooth gasket and there is little if any projection of flanges or holding means above the face of the gasket. Under some circumstances it is desirable to have the flange project perhaps a thousandth of an inch, seldom if any more.

In assembling the gasket, the bottom plate has added to it a series of filler plates, some of them conforming in shape to the bottom plate, some cut away or cut back. Then the top plate is laid over and then the grommets are inserted and flanged or the bottom plate is bent up through the gasket and flanged. This leaves a gasket wherein the laminations are rather loosely assembled together and wherein the thickness of the gasket adjacent the flanged over or grommet portions is materially greater than the thickness of the body of the gasket but the gasket is in workable condition, can be shipped and handled and this is the gasket which has heretofore been provided to the automotive industry.

The next step in manufacture comprises feeding the gasket thus formed between rolls or subjecting it to pressure by a press to upset the flanged portions, compress the bundle or package of shims and distort the flange portions, forcing them down into the clearance provided by cutting away some of the filler plates. This results in a compacted gasket ready for use in the engine and requiring no special tension of the engine holding bolts and no further treatment to properly position and shape the gasket.

26 is a press bed; 27 a press frame; 28 a press cylinder; 29 an anvil; 30 a pressure head provided so that the gasket may be squeezed between the anvil and the head to compact and compress it to the desired size.

Figure 5:
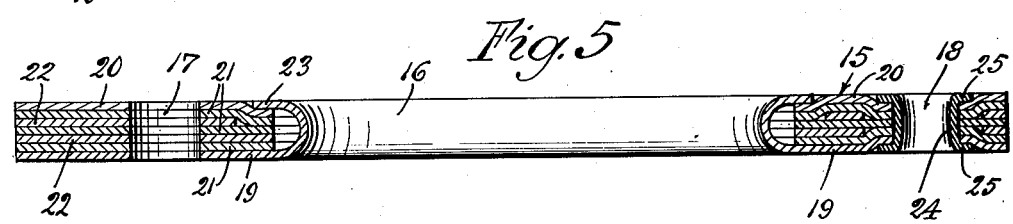
Figure 5 is a similar view showing the gasket after it has been compacted to the size and shape intended for use in an engine.
Figure 6:
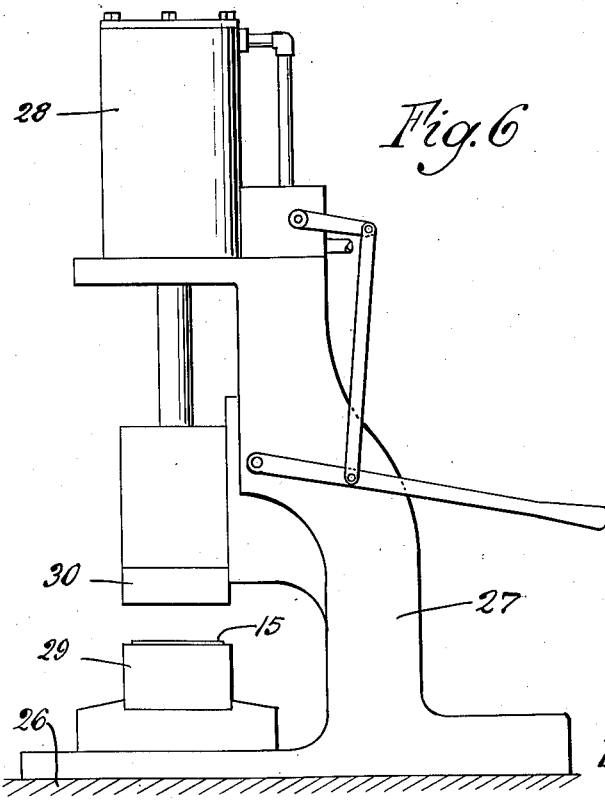
Figure 6 is a press for compacting the gasket.

The plates to which I have referred which make up the gasket, it will be understood are very thin, perhaps only a very few thousandths of an inch in thickness each and may be properly referred to as laminations. These plates or laminations are in flat-wise contact one with the other and are sufficiently thin and flexible that even though the gasket is compacted as indicated in Figure 5, still the gasket is a flexible one and can give or yield locally to conform to variations in contour of the mating cylinder and cylinder head surfaces which are inevitable as resulting from the manufacturing operation. It is also important that these laminations be thin and flexible because otherwise they will not yield satisfactorily to pressure to cause the characteristic interlocking and flowing of the material which makes it possible to obtain the flat parallel sided gasket shown in Figure 5.

I claim:

The method of manufacturing gaskets for engines and the like which consists in assembling a plurality of thin, flexible metallic laminae of similar size and shape in register with one another and with a cover plate in a pack, bending a portion of the cover plate toward the pack into a position intersecting the plane of the pack and then bending an extended portion of the cover plate beyond the portion thus bent into parallelism with the pack so that it rests against the side of the pack opposed to the cover plate, then applying pressure to the flanged portion of the cover plate thus formed until the flange has been forced into the body of the pack a distance substantially equal to the thickness of the flange such that the outer surface of the flange is in alignment with the adjacent surface of the remainder of the pack.

JAMES G. DICKSON.